(12) United States Patent
Gassmann et al.

(10) Patent No.: US 11,701,960 B2
(45) Date of Patent: Jul. 18, 2023

(54) ACTUATOR ARRANGEMENT AND TRANSMISSION ARRANGEMENT

(71) Applicant: GKN Automotive Limited, Birmingham (GB)

(72) Inventors: Theodor Gassmann, Siegburg (DE); Maximilian Werkhausen, Cologne (DE); Jan Haupt, Kürten (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/775,332

(22) PCT Filed: Nov. 6, 2020

(86) PCT No.: PCT/EP2020/081317
§ 371 (c)(1),
(2) Date: May 9, 2022

(87) PCT Pub. No.: WO2021/094223
PCT Pub. Date: May 20, 2021

(65) Prior Publication Data
US 2022/0379711 A1    Dec. 1, 2022

(30) Foreign Application Priority Data
Nov. 11, 2019    (DE) ..................... 10 2019 130 357.5

(51) Int. Cl.
*F16H 48/34* (2012.01)
*B60K 6/387* (2007.10)
(Continued)

(52) U.S. Cl.
CPC .............. *B60K 6/387* (2013.01); *B60K 6/365* (2013.01); *B60K 6/48* (2013.01); *B60K 6/547* (2013.01);
(Continued)

(58) Field of Classification Search
CPC ...... F16D 21/00; F16H 37/0806; F16H 48/34; F16H 2048/343; F16H 63/08;
(Continued)

(56) References Cited

U.S. PATENT DOCUMENTS 10,683,921 B2 * 6/2020 Gnebner ................. F16H 48/34
2018/0328487 A1 11/2018 Nishimoto et al.

FOREIGN PATENT DOCUMENTS

| CN | 110388438 A | * 10/2019 |
|---|---|---|
| DE | 2138657 C3 | 12/1983 |

(Continued)

OTHER PUBLICATIONS

International Search Report and Written Opinion for PCT/EP2020/081317 dated Jan. 22, 2021 (12 pages; with English translation).

*Primary Examiner* — Roger L Pang
(74) *Attorney, Agent, or Firm* — Bejin Bieneman PLC

(57) ABSTRACT

An actuator assembly for actuating two switching units in the driveline of a motor vehicle comprises a housing; an actuator drive; a switching rod arranged in the housing and axially movable by the actuator drive in three positions; a first switching element and a second switching element axially movably arranged on the switching rod; a spring element which biases the first switching element against a first shaft stop and the second switching element against a second shaft stop; a first housing stop against which the first switching element can be axially supported; and a second housing stop against which the second switching element can be axially supported. A transmission assembly can include such an actuator assembly.

15 Claims, 4 Drawing Sheets

(51) Int. Cl.
    *B60K 6/365*     (2007.10)
    *B60K 6/48*     (2007.10)
    *B60K 6/547*     (2007.10)
    *F16D 21/00*     (2006.01)
    *F16H 37/08*     (2006.01)
    *F16H 63/08*     (2006.01)
    *F16H 63/30*     (2006.01)

(52) U.S. Cl.
    CPC .......... *F16D 21/00* (2013.01); *F16H 37/0806* (2013.01); *F16H 48/34* (2013.01); *B60K 2006/4825* (2013.01); *B60Y 2200/92* (2013.01); *F16H 63/08* (2013.01); *F16H 2048/343* (2013.01); *F16H 2063/3063* (2013.01); *F16H 2063/3073* (2013.01)

(58) Field of Classification Search
    CPC ..... F16H 2063/3063; F16H 2063/3073; F16H 2063/3079; F16H 2048/368; F16H 63/22; F16H 63/24; B60K 6/387; B60K 6/365; B60K 6/48; B60K 6/547

USPC ................................................ 475/5; 74/361
See application file for complete search history.

(56) References Cited

FOREIGN PATENT DOCUMENTS

| | | |
|---|---|---|
| DE | 69516766 T2 | 12/2000 |
| DE | 10 2007 040 040 A1 | 2/2009 |
| DE | 10 2007 055 307 A1 | 5/2009 |
| DE | 10 2016 204 133 A1 | 9/2017 |
| JP | 2008281015 A * | 11/2008 |
| WO | 2010027584 A2 | 3/2010 |
| WO | 2012007031 A1 | 1/2012 |
| WO | 2015149875 A1 | 10/2015 |
| WO | 2019063227 A1 | 4/2019 |
| WO | WO-2022237929 A1 * | 11/2022 |

* cited by examiner

ACTUATOR ARRANGEMENT AND TRANSMISSION ARRANGEMENT

CROSS-REFERENCE TO RELATED APPLICATIONS

This application is a national stage of, and claims priority to, Patent Cooperation Treaty Application No. PCT/EP2020/081317, filed on Nov. 6, 2020, which application claims priority to German Application No. DE 10 2019 130 357.5, filed on Nov. 11, 2019, which applications are hereby incorporated herein by reference in their entireties.

BACKGROUND

Controllable switching or shift units can be used in drivelines of motor vehicles, for example, for clutches to connect and disconnect driveline sections, for multi-step transmissions to engage different gears, for epicyclic gearings to lock or release a compensating movement of various members of the gearing and/or for parking locks.

DE 695 16 766 T2 describes a shifting device with a linear actuator and a shift fork for a gear change transmission. A movement of the shift fork is initiated by several springs displaced by the linear actuator.

From DE 21 38 657 C3, a shifting device with a clutch for a countershaft transmission is known. The clutch comprises two clutch members which are acted upon axially away from each other by a spring.

From DE 10 2007 040 040 A1, a shift element is known comprising three shift positions for shifting two gear stages. The shift element comprises two shift sleeve halves which can be actuated by a shift fork.

From WO 2012 007031 A1, an electric drive for a motor vehicle is known which comprises an electric motor and a transmission unit. The transmission unit has a planetary gearing and a differential gearing, which are arranged coaxially to each other, and a clutch, which can be transferred into three switching positions by an actuator. By means of the clutch, a sun gear of the planetary gearing can selectively be connected to the ring gear in a rotationally fixed manner or can be supported on a stationary housing part in a rotationally fixed manner or can be transferred to an idling position.

From WO 2015/149875 A1, an actuating assembly for a clutch in a multi-step transmission is known. The actuating assembly comprises a ball screw drive driven by an electric motor. By means of the ball screw drive, the clutch can be selectively transferred into three shift positions, a first shift stage, a second shift stage and into a neutral position.

From WO 2019/063227 A1, a motor vehicle transmission with a rotatable shift drum with two groove tracks is known. A first groove path has a front path section, a rear path section and a side section which is formed as a dead end. A tracking element engages in the first groove path, which is coupled to a parking lock in such a way that an arrangement of the tracking element in the side section causes an engaged state of the parking lock. A second tracking element engages in the second groove path and is coupled to a shift fork for shifting a forward gear of the motor vehicle.

From WO 2010/027584 A2, a power transmission unit with a disengagable input shaft is known. For this, a clutch is provided which can be transferred to a closed position or a release position by means of an actuator assembly.

From DE 10 2016 204 133 A1, a linear actuator is known comprising a first screw drive with a self-locking first spindle and a first nut, a second screw drive with a non-self-locking second spindle and a second nut, and a gearing which couples and decouples rotational movements of the first and second spindles.

From DE 10 2007 055 307 A1, an actuating unit for a claw transmission with a shift fork is known that is axially displaceable between a first gear stage and a neutral position. Two positioning elements for the shift fork are supported in an axially displaceable but rotationally fixed manner on a position shaft.

SUMMARY

The present disclosure relates to an actuator assembly for actuating a plurality of switching units, in particular for a driveline of a motor vehicle, and to a transmission assembly having such an actuator assembly. Multi-stage, automated vehicle transmissions can be shifted via a central hydraulic unit or several electro-mechanical actuators. In this context, a particularly short, partly load-free overlap shifting is to be realized, in order to ensure a great driving comfort and high performance associated therewith.

The present disclosure describes an actuator arrangement which enables shifting of several switching units in the driveline of a motor vehicle and which has a simple design, as well as a transmission arrangement with such an actuator arrangement which has a simple design.

An actuator assembly for actuating several switching units for a motor vehicle driveline is described, comprising: a housing; an actuator drive; a switching rod which is arranged in the housing and can be moved by the actuator drive into at least three positions; a first switching element and a second switching element which are arranged axially movably on the switching rod; a spring element which presses the first switching element against a first shaft stop and the second switching element against a second shaft stop in opposite axial directions; a first housing stop against which the first switching element is axially supported when the switching rod is moved in a direction of force acting from the spring element to the first switching element; a second housing stop against which the second switching element is axially supported when the switching rod is moved in a direction of force acting from the spring element to the second switching element.

An advantage of the actuator assembly is that it has a simple and inexpensive structure. Because two switching elements are arranged on the switching rod as described, several different switching positions of the two switching elements can be set with one movement of the switching rod. Advantageously, only one rotary drive is required to actuate the two switching elements for different switching operations. The switching elements can be parts of shift units in the driveline of a motor vehicle, for example of a transmission, a clutch, in particular a disengagement clutch, and/or a parking lock. In the case of drive arrangements with several drive sources and shift or multi-mode transmissions, the different motors can be used to bridge a drop in drive power during the shift process. In these cases, it is possible to dispense with load shifting and use serial shifting for a gear or mode change. These switching operations can be realized in a simple manner by the present actuator arrangement. A particularly simple and thus cost-effective structure can be achieved by using form-locking clutches as shifting units, which only require a comparably low shifting force compared to conventional synchronizers or clutches.

The actuator drive can be selected according to the installation space conditions and technical requirements and can, for example, be designed in the form of an electromotive drive, electromagnetic drive or hydraulic drive or comprise such a drive. The drive can be a linear drive or rotary drive.

When using a rotary drive, the switching rod is rotatably driven and can thus also be referred to as a switching shaft. In particular, a spindle mechanism can be provided which converts a rotary movement introduced into the switching rod into an axial movement of the switching rod. In an embodiment with a rotatable switching rod, the two switching elements can be rotatably mounted on the switching rod so that they retain their rotational position when the switching rod is rotated by the rotary drive. The rotary drive is designed to rotatably drive the switching rod in two directions of rotation. The rotary drive can be configured in the form of an electromechanical servomotor or electric motor, although other rotary drives such as a hydraulic or pneumatic drive are also possible.

The actuator drive and the switching rod can be arranged axially spaced from each other, coaxial to each other or orthogonal to each other. A transmission stage with two or more drive parts may be provided between the rotary drive and the switching rod. A drive part arranged in the power path between the rotary drive and the switching rod may be designed to be axially displaceable relative to a drive part engaged therewith. The drive parts can be gear wheels, for example.

The two switching elements can each be supported against the switching rod and against a fixed stop, which can also be referred to as a housing stop. Any stop against which the respective switching element can be axially supported when the shaft is displaced can be used as a fixed stop. For example, the stop can be a portion of a housing or a component connected to the housing.

Starting from a central position, the switching rod can be moved to a first axial position, wherein the first switching element is supported against the first housing stop, and the second switching element is carried along by the second shaft stop and moves away from the second housing stop. Accordingly, starting from the middle position, the switching rod can be moved to an opposite second axial position, wherein the second switching element is supported against the second housing stop and the first switching element is carried along by the first shaft stop and moves away from the first housing stop. When using a rotary drive and spindle mechanism, the axial movement of the switching rod is effected by corresponding rotation in a first direction of rotation and an opposite second direction of rotation, respectively, by the spindle mechanism.

According to an embodiment, the spring element can axially bias the first switching element and the second switching element away from each other, in which case the first housing stop and the second housing stop can be directed axially towards each other. However, a reverse arrangement is also possible, in which the two switching elements are biased towards each other by means of one or more springs. In this case, the fixed stops would be directed away from each other. The spring element can be arranged in particular on the switching rod between the first switching element and the second switching element and can be designed, for example, as a helical spring, although other arrangements and designs of the spring are also possible.

According to a possible embodiment, at least one of the first switching element and the second switching element may be designed in the form of a switching fork, which is designed for axial displacement of a switching sleeve. Furthermore, the first switching element may serve to actuate a first switching unit and the second switching element may serve to actuate a second switching unit. At least one of the switching units can include a form-locking clutch and/or be designed for drivingly coupling or uncoupling of a differential gearing and/or for blocking or releasing an epicyclic gearing.

The switching rod is axially movable in the housing and, depending on the actuator drive, optionally rotatably supported. In an embodiment with a rotary drive and spindle mechanism, the switching rod can be supported in the housing, at one end by means of the spindle mechanism and at the other end by means of a plain bearing, so as to be rotatable about the axis of rotation. In this case, one bearing point of the switching rod is connected to the stationary part of the spindle drive. In this way, the bearing point of the switching rod and the conversion of the rotary movement of the drive into an axial movement are realized in one component. Furthermore, low mass moments of inertia of the components enable fast switching times. The opposite bearing point is formed by the plain bearing, which allows the shaft to be moved axially.

The spindle mechanism may have a support part that is connected to the housing in a rotationally fixed and axially fixed manner, and a rotary part that is fixed to the shift rod. The rotary part is connected to the support part in a screwable manner, so that rotating the switching rod and the rotary part connected thereto relative to the support part causes an axial displacement of the switching rod.

The above-mentioned object is further solved by a transmission assembly for a motor vehicle with an actuator assembly which can be designed according to one or more of the above embodiments, comprising: a differential gearing having a differential cage rotatably drivable by a drive member, a first differential output part for driving a first drive shaft and a second differential output part for driving a second drive shaft; a first switching unit disposed between the drive member and the differential cage for selectively connecting the differential cage to the drive member for torque transmission or disconnecting the differential cage from the drive member; and a second switching unit by which the first differential output part or the second differential output part is connectable to the first output shaft or the second output shaft, respectively, for torque transmission, or can be disconnected therefrom.

Accordingly, the transmission arrangement has the same advantages as the actuator arrangement, so that reference is made to the above description by way of abbreviation. All features described in connection with the actuator assembly can be realized in the transmission assembly. The transmission assembly can be part of a hybrid drive with an electric machine and an internal combustion engine, which can each drive the differential gearing individually or jointly superimposed.

A method for actuating the present actuator assembly may comprise the following steps: in a central position of the switching rod, both switching elements are biased by the spring element against the respective shaft stop or housing stop, respectively, wherein the two switching elements assume their respective first switching positions (S6a, S7a); when the switching rod moves in the first axial direction, the second switching element is axially carried along by the second shaft stop and is transferred into a second switching position (S7b) of the second switching element, wherein the first switching element is axially supported against the first housing stop and assumes a first switching position (S6a) of the first switching element; and when the switching rod is moved in the second axial direction, the first switching element is axially carried along by the first shaft stop and is transferred into a second switching position (S6b) of the first switching element, wherein the second switching element is axially supported against the second housing stop and assumes a first switching position (S7a) of the second switching element.

BRIEF SUMMARY OF THE DRAWINGS

Exemplary embodiments are explained below with reference to the drawing figures. Herein.

DESCRIPTION

Figure 1:
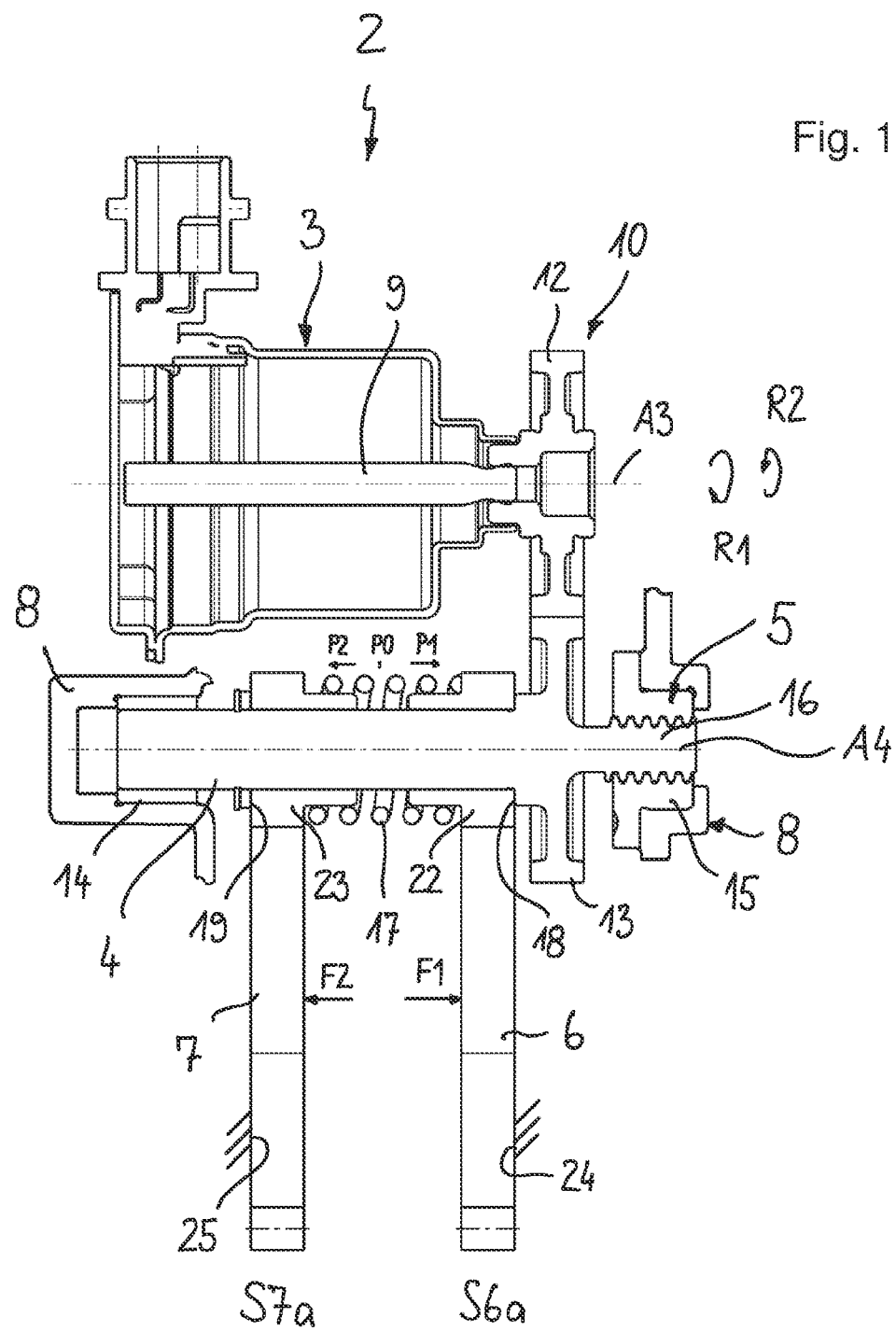
FIG. 1 shows an actuator assembly for actuating two switching units for a driveline of a motor vehicle in a first embodiment.
Figure 2A:
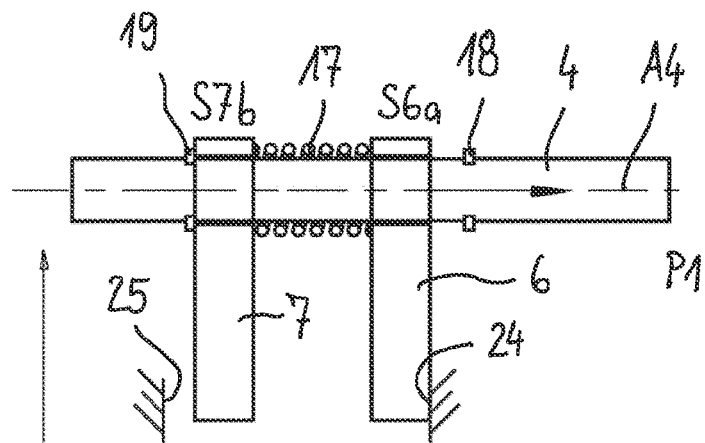
FIG. 2A shows the switching group of the actuator arrangement according to FIG. 1 in a first switching position (P1) of the switching rod.
Figure 2B:
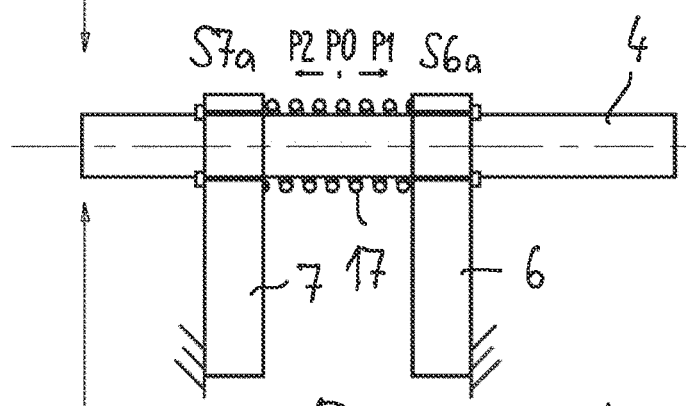
FIG. 2B shows the switching group of the actuator assembly according to FIG. 1 in a middle switching position (P0) of the switching rod.
Figure 2C:
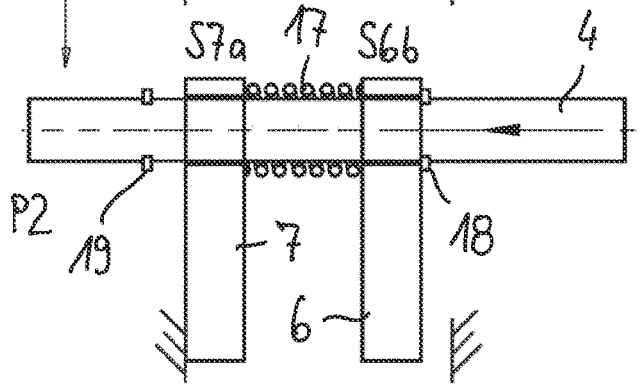
FIG. 2C shows the switching group of the actuator assembly according to FIG. 1 in a second switching position (P2) of the switching rod.
Figure 3:
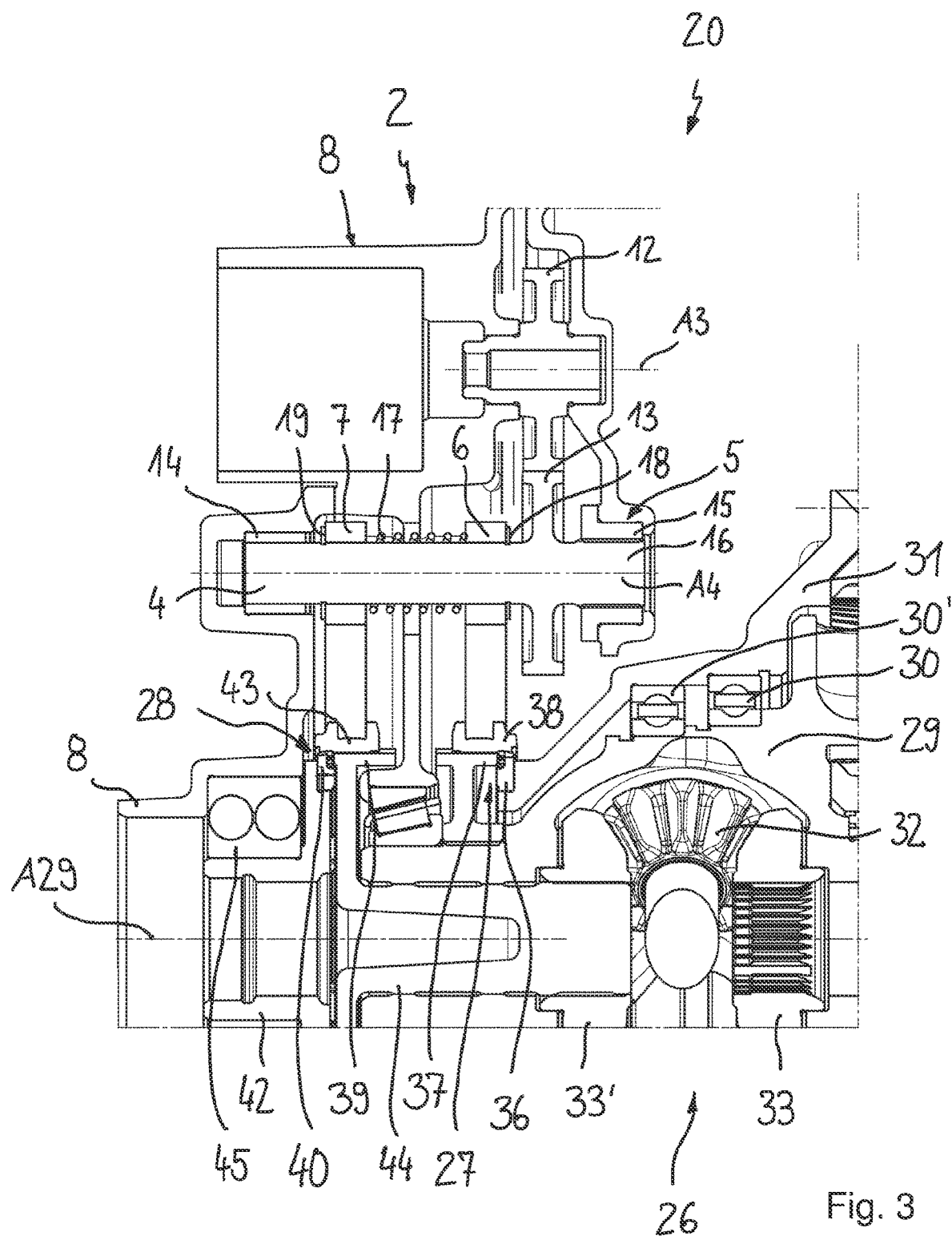
FIG. 3 a transmission unit with an actuator assembly according to FIG. 1 in a sectional view.

FIGS. 1 to 3, which are described together below, show an actuator assembly 2 for actuating at least two switching units for a driveline of a motor vehicle (not shown). The actuator assembly 2 can be used to actuate several switching units, for example to shift at least two gears of a multi-step transmission, to actuate a parking lock, to actuate a clutch and/or to lock a differential gearing. The rotary drive 3 can, for example, be designed in the form of an electric motor without being limited to this.

The actuator assembly 2 has an actuator drive 3, a switch rod 4 which is axially movable by the actuator drive, and two switching elements 6, 7 connected to the switching rod 4. In the present embodiment, the actuator drive 3 is designed in the form of a rotary drive, in particular an electromechanical servomotor, which rotatingly drives the switching rod 4. A spindle mechanism 5 converts a rotary movement of the switching rod 4 into an axial movement. The rotary drive 3 can be rotationally driven in a first direction of rotation R1 and an opposite second direction of rotation R2, so that the switching rod 4, which is drivingly connected thereto, can likewise be rotated in two directions of rotation. It goes without saying that other embodiments with alternative drives or without a spindle drive are also possible, for example with an electromagnetic drive which acts on the shifting rod in a translatory manner.

In the present embodiment, the rotary drive 3 and the switching rod 4 are arranged on two parallel axes A3, A4 in a housing 8 that is only partially shown here. In the present embodiment, an optional gearing 10 or transmission stage is provided for transmitting a rotary movement from the motor shaft 9 of the rotary drive to the switching rod 4. The gearing comprises a first gear 12 fixedly connected to the motor shaft 9, and a second gear 13 meshing with the first gear 12 and fixedly connected to the switching rod 4. It is understood that the transmission of the rotary movement from the rotary drive 3 to the switching rod 4 can be configured according to the installation space conditions and technical requirements.

The switching rod 4 is mounted in the housing 8 so that it can move axially and rotate about the axis of rotation A4. Bearing support is provided at one end of the switching rod 4 by the spindle mechanism 5 and at the opposite end by a plain bearing 14. The spindle mechanism 5 implements the bearing point of the switching rod 4 and the conversion of the rotary movement into an axial movement in one component.

The spindle mechanism 5 comprises a support part 15, which is rotationally and axially fixedly connected to the housing 8, and a rotary part 16, which is fixedly connected to the switching rod 4. The rotary part 16 and the support part 15 are configured and connected to each other in such a way that a relative rotary movement of the two parts to each other causes a relative displacement movement. For this purpose, the support part 15 is configured in the form of a spindle nut, and the rotary part 16 in the form of a spindle shaft or a spindle shaft portion, respectively. The spindle shaft portion 16 is connected to the spindle nut 15 in a screwable manner, so that a rotation of the switching rod 4 and the spindle portion 16 connected thereto relative to the spindle nut 15 causes an axial displacement of the switching rod 4.

The first switching element 6 and the second switching element 7 are each rotatably mounted and axially movably arranged on the switching rod 4. A spring element 17 is arranged to be effective between the two switching elements 6, 7, which axially biases the first switching element 6 against a first shaft stop 18 and the second switching element 7 against a second shaft stop 19 away from each other. The spring element 17 is designed as a helical spring which is arranged coaxially to the switching rod 4. In the present embodiment, the switching elements 6, 7 each have an associated carrier sleeve 22, 23, which are supported on the switching rod 4 in a rotatable and axially moveable manner. The carrier sleeves 22, 23 each have a sleeve portion onto which the helical spring 17 is fitted with its end sections. This prevents the coil spring from coming into contact with the switching rod. The switching elements 6, 7 are designed in particular in the form of a switching fork, which can be configured for axial displacement of an associated switching sleeve.

A first fixed stop 24 is provided against which the first switching element 6 can be axially supported when the switching rod 4 is moved in the direction of force F1 effective from the spring element 17 onto the first switching element 6. Correspondingly, a second fixed stop 25 is provided for the second switching element 7, against which it can be axially supported when the switching rod 4 is moved in an opposite direction of force F2 effective from the spring element 17 onto the second switching element 7.

The mode of operation of the actuator assembly is as follows:

In the middle position P0 of the switching rod 4, which is shown in FIG. 1 and FIG. 2B, the first switching element 6 and the second switching element 7 are in a respective first switching position S6a, S7a.

Starting from the middle position P0, the switching rod 4 by being rotated in a first direction of rotation by means of the spindle mechanism 5 can be moved into a first axial position P1, which is shown in FIG. 2A. During the axial movement of the switching rod 4, the first switching element 6 is supported axially against the first housing stop 24, while the switching rod 4 continues to move axially with respect to the latter. This means that the first support element 6 remains in its first switching position S6*a*. In contrast, the second switching element 7 is driven axially by the second shaft stop 19 and moves together with the switching rod 4 in axial direction, thereby moving axially away from the second housing stop 25 and assuming a second switching position S7*b* (FIG. 2A).

Analogously, the switching rod 4, again starting from the middle position P0, can be moved by being rotated in the opposite second direction of rotation by means of the spindle mechanism 5 into the second axial position P2, which is shown in FIG. 2C. During the axial movement of the switching rod 4, the second switching element 7 is supported axially against the second housing stop 25, while the switching rod 4 continues to move axially with respect to the latter. This means that the second support element 7 remains in its first switching position S7*a*, while the first switching element 6 is driven axially by the first shaft stop 18 and moves together with the switching rod 4 in axial direction, thereby moving axially away from the first housing stop 24 and assuming the second switching position S6*b* (FIG. 2C).

FIG. 3 shows an application example for an actuator assembly according to the disclosure, namely in a slightly modified embodiment compared to FIG. 1 in a transmission assembly 20. The structure and mode of operation of the actuator assemblies 2 are comparable, so that reference is made to the above description by way of abbreviation. The same details are provided with the same reference signs as in FIGS. 1 and 2. The present transmission assembly 20 comprises a differential gearing 26 and two switching units 27, 28 which can be actuated by the actuator assembly 2.

The differential gearing 26 comprises a differential cage 29 which is rotatably supported by bearings 30, 30' about an axis of rotation A29 in a drive part 31. The differential is provided to transmit a drive torque introduced into the differential cage 29 evenly to a right and left side shaft of a motor vehicle. The differential gearing 26 comprises a plurality of differential gears 32 which rotate together with the differential cage 29 about the axis of rotation A29, and two side shaft gears 33, 33' which are in meshing engagement with the differential gears. The side shaft gears 33, 33' serve as output parts of the differential and can be drivingly connected to a respective side shaft of the motor vehicle via intermediate shafts 34, 35.

In the present embodiment, a controllable first switching unit 27 is provided between the drive part 31 and the differential cage 29. The switching unit 27 comprises a form-locking clutch having a first clutch part 36, which is fixedly connected to the rotatable drive part 31, and a second clutch part 37, which is connected to the differential cage 29 in a rotationally fixed manner, as well as a coupling element 38, for selectively connecting or disconnecting the two clutch parts 36, 37 to or from each other. The coupling element 38 is configured in the form of a sliding sleeve which is connected to the second clutch part 37 in a rotationally fixed and axially movable manner. The sliding sleeve is connected to the first switching element 6 of the actuator assembly 2. In the open position of the coupling 27, the drive part 31 and the differential cage 29 can rotate freely against each other, while in the closed position of the coupling they are connected to each other in a rotationally fixed manner and jointly rotate about the axis of rotation A29.

The second switching unit 28 is arranged in the power path between the sideshaft gear 33' and an associated sideshaft of the vehicle axle. The second switching unit 28 is provided to selectively transmit torque between the differential gearing 26 and the side shafts of the drive axle or to disconnect said components from each other. The second switching unit 28 comprises in particular a form-locking clutch having a first clutch part 39 which is connected to the sideshaft gear 33' in a rotationally fixed manner, a second clutch part 40, which is connected to a shaft part 42 in a rotationally fixed manner, and a coupling element 43. The first and second clutch parts 39, 40 can be selectively connected to each other by means of the coupling element 43 in order to transmit torque to the drive axle, or they can be disconnected from each other so that the drive axle is uncoupled from the power path arranged upstream. The coupling element 43 is designed in the form of a sliding sleeve, which is connected to the first clutch part 39 in a rotationally fixed and axially movable manner. The first clutch part 39 is formed radially on the outside on a flange section of an intermediate shaft 44 which is connected to the side shaft gear 33' in a rotationally fixed manner. The shaft part 42 is rotatably supported in the stationary housing 8 by means of a bearing 45 and serves to transmit torque to the associated side shaft.

The first and second clutches 27, 28 can be actuated by the actuator assembly 2, which in terms of structure and mode of operation corresponds to the embodiment according to FIGS. 1 and 2, the description of which it is thus referred to by way of abbreviation.

The following switching positions can be effected with the actuator assembly 2: In the middle position P0 of the switching rod 4, which is shown in FIG. 3, both switching elements 6, 7 are axially supported against the respective end stop 24, 25 (not shown), so that both clutches 27, 28 are closed. In the first axial position P1 of the switching rod 4, the first switching element 6 is supported against the first end stop, wherein the first clutch 27 is closed by the first switching element 6. The second switching element 7 is distanced from the second end stop, wherein the second clutch 28 is opened by the second switching element 7. In the second axial position P2 of the switching rod 4, the second switching element 7 is supported against the second end stop, wherein the second clutch 28 is closed. The first switching element 6 is distanced from the first end stop, wherein the first clutch 27 is opened.

Figure 4:
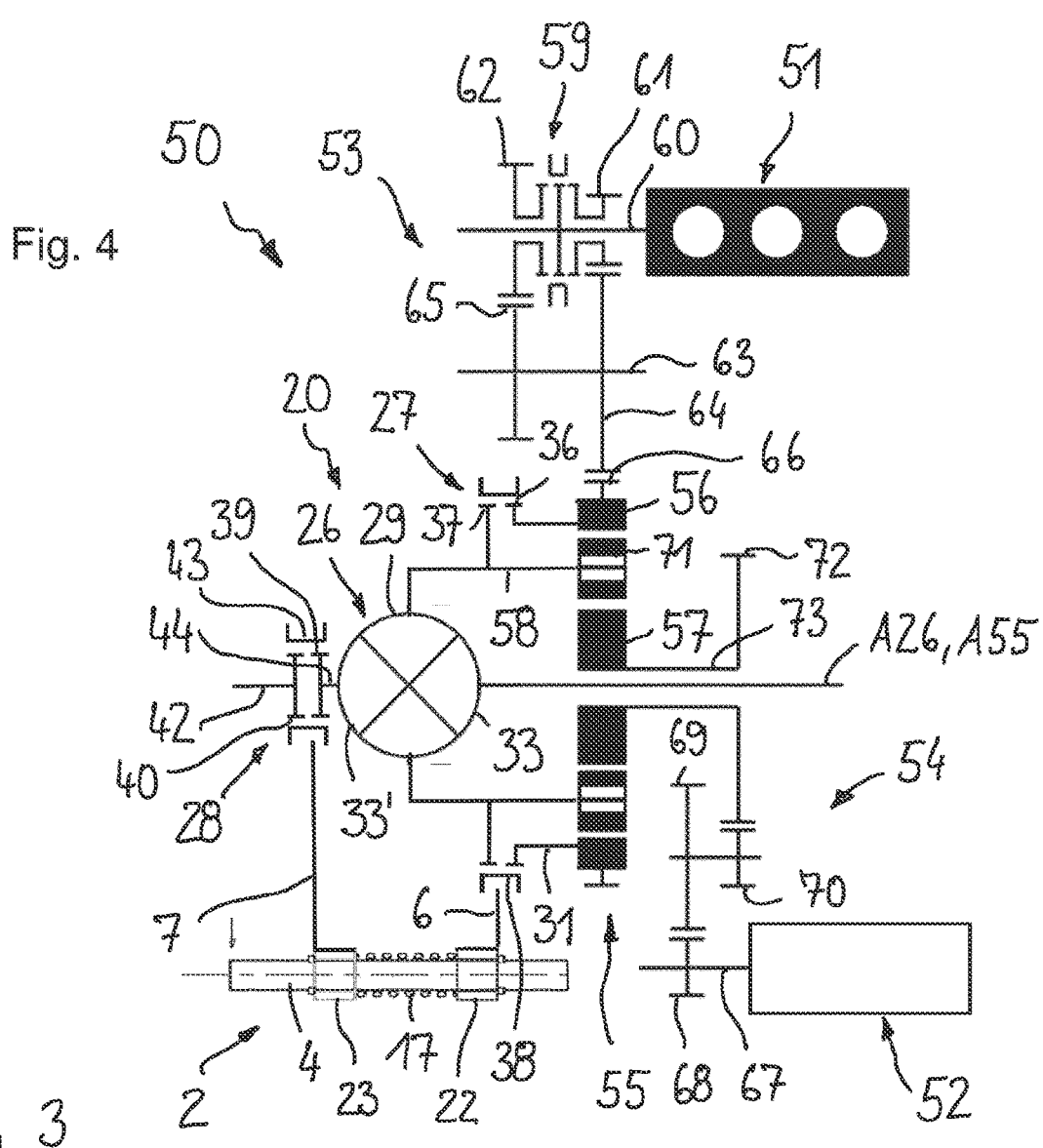
FIG. 4 a hybrid drive with an actuator assembly according to FIG. 1 in a schematic representation.

FIG. 4 shows a transmission assembly 20, respectively hybrid drive assembly 50 according to the disclosure for driving a vehicle axle. The hybrid drive assembly 50 comprises an internal combustion engine 51, an electric machine 52 and the transmission assembly 20 with actuator assembly 2 according to the disclosure.

The transmission assembly 20 is designed to transmit a first drive torque from the internal combustion engine 51 and/or a second drive torque from the electric machine 52 to a drive axle of the vehicle. For this purpose, the transmission assembly 20 comprises a first transmission unit 53 associated with the internal combustion engine, a second transmission unit 54 associated with the electric machine, a superposition gearing 55 with a first input part 56 connected to the first transmission unit 53, a second input part 57 connected to the second transmission unit 54, and an output part 58 connected to a differential gearing 26 arranged downstream in the power path. The controllable first clutch 27 is provided for selectively coupling or decoupling the first input part 56 and the output part 58 of the superposition gearing 5. The controllable second clutch 28 is arranged in the power path downstream of the differential gearing 26, i.e. between the latter and one of the side shafts of the vehicle axle, and serves as a side shaft disconnection.

In the present embodiment, the first transmission unit 53 is configured as a multi-step gearing without being restricted thereto. The multi-step gearing 53 enables power transmission from the internal combustion engine 51 to the superposition gearing 56 with different transmission ratios and/or interruption of the power transmission. A controllable switching clutch 59, which can also be referred to as a switching unit, is provided for shifting.

In particular, the multi-step gearing 53 comprises a first drive gear 61 and a second drive gear 62 which are rotatably mounted on the input shaft, and an intermediate shaft 63 parallel to the input shaft 60 and having a first intermediate gear 64 engaging with the first drive gear 61 and a second intermediate gear 65 engaging with the second drive gear 62. The clutch 59 is provided to selectively connect or disconnect the first drive gear 61 or the second drive gear 62 to or from the input shaft 60. A first shift stage is formed by the first pair of gears (61, 64) to transmit torque from the input shaft 60 to the first input part 56 of the superimposed gearing 55 with a first transmission ratio (first gear). A second shift stage is formed by the second pair of gears (62, 65), via which torque can be transmitted to the superposition gearing 55 with a second transmission ratio (second gear). In a neutral position, both drive gears 61, 62 are disconnected from the input shaft 60.

The intermediate shaft 63 is arranged parallel to the axis of rotation A26, A55 of the superimposed gearing 55 and the differential gearing 26 respectively. For power transmission, the first intermediate gear 64 is engaged with a ring gear 66 for driving the first input part 56 of the superposition gearing 55. The ring gear 66 is firmly connected to a carrier element 31 of the superposition gearing 5, which is supported so as to be rotatable relative to the output part 58 of the superposition gearing 55 and is drivingly connectable thereto via the clutch 27. In this respect, the carrier element 31 can also be referred to as drive part.

The second gear unit 54 is drivingly connected to an electric machine 52. The electric machine 52 has, in particular, a stator and a rotor which is rotatable relative thereto and which rotatingly drives a drive shaft 67 when the machine is energized. The drive shaft 67 is drivingly connected to the second input part 57 of the superposition gearing 55 via the second gear unit 54. The second gear unit 54 is preferably configured as a reduction gearing, in particular as a spur gearing, in order to translate a rotary movement initiated by the electric machine 52 from fast to slow. The reduction gearing 54, respectively spur gearing, has a first transmission stage with a first drive gear 68 and a first intermediate gear 69 meshing therewith, and a second transmission stage with a second intermediate gear 70 and a second drive gear 72 meshing therewith. The second drive gear 72 is connected to the second input part 57 via a hollow shaft 73.

The superimposed gearing 55 is designed as a planetary gearing, with a ring gear 56 as a first input part, a sun gear 57 arranged coaxially to the ring gear as a second input part, a plurality of planet gears 71 which meshingly engage with the sun gear and the ring gear, as well as a planet carrier as an output part 58 on which the planet gears are rotatably mounted. The planet carrier 58 is firmly connected to the differential cage 29, wherein both components together can also be referred to as carrier element. By coupling the carrier element 31 with the carrier element respectively planet carrier 58, a rotational degree of freedom of the superimposed gearing 55 is limited, i.e. a relative rotational movement is cancelled. In the closed state of the clutch 27, the parts 56, 57, 58 of the superposition gearing 55 are blocked with each other and jointly rotate about the common axis of rotation A55.

The first clutch 27 and the second clutch 28 can be actuated by an actuator assembly 2 according to the disclosure, which is only shown schematically here. The structure and mode of operation correspond to the embodiments shown in FIGS. 1 to 3, so that reference is made to the above description for the sake of brevity with regard to the common features. In this connection, the same details are provided with the same reference signs.

The present transmission assembly 20, respectively hybrid drive 50 with internal combustion engine 51 and electric machine 52, offers in an advantageous manner in particular the technical characteristics of a continuously variable transmission (CVT), a parallel drive by means of both drive sources, i.e. internal combustion engine and electric motor, a reverse drive, a trailing start of the internal combustion engine, a load-free shiftability, a charging possibility of the battery by means of the internal combustion engine when the vehicle is stationary as well as a starting function of the internal combustion engine by means of the electric motor when the vehicle stands still. Overall, the transmission assembly thus combines a number of operating modes with a simple and compact design. These operating modes can be realized in a simple manner by means of only one actuator assembly 2, which can transfer the clutches 27, 28 to their "closed" or "open" position via the respective switching elements 6, 7.

Figure 5:
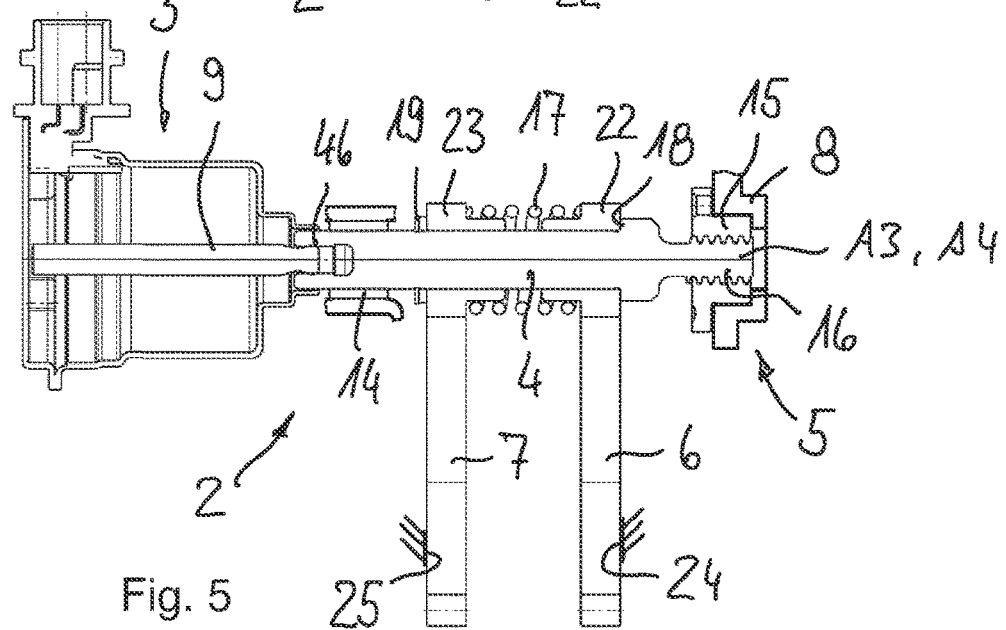
FIG. 5 an actuator assembly for actuating two switching units for a driveline of a motor vehicle in a further embodiment.

FIG. 5 shows an actuator assembly 2 according to the disclosure in a second embodiment, which largely corresponds to the embodiment according to FIGS. 1 to 4, so that reference is made to the above description with regard to the common features. In this context, identical or corresponding details are provided with the same reference signs. A difference in the present embodiment according to FIG. 5 is that the switching rod 4 is arranged coaxially to the motor shaft 9 and is connected thereto in a rotationally fixed manner via connecting means 46. A transmission is not provided here.

LIST OF REFERENCE SIGNS 2 actuator assembly
3 actuator drive
4 switching rod
5 spindle mechanism
6 first switching element
7 second switching element
8 housing
9 motor shaft
10 gearing
12 first gear
13 second gear
14 plain bearing
15 support part
16 rotary part
17 spring element
18 first shaft stop
19 second shaft stop
20 transmission assembly
22 first support sleeve
23 second support sleeve
24 first housing stop
25 second housing stop
26 differential gearing
27 first switching unit 28 second switching unit
29 differential cage
30, 30' bearing
31 drive part/carrier element
32 differential gear
33, 33' output part/sideshaft gear
34 intermediate shaft
35 intermediate shaft
36 first clutch part
37 second clutch part
38 coupling element
39 first clutch part
40 second clutch part
42 shaft part
43 coupling element
44 intermediate shaft
45 bearing
46 connecting means
50 hybrid drive assembly
51 internal combustion engine
52 electric machine
53 first gear unit/multi-step gearing
54 second gear unit/reduction gearing
55 superimposed gearing
56 first input part
57 second input part
58 output part
59 clutch
60 input shaft
61 first drive gear
62 second drive gear
63 intermediate shaft
64 first intermediate gear
65 second intermediate gear
66 output part/ring gear
67 input part/drive shaft
68 first drive gear
69 first intermediate gear
70 second intermediate gear
71 planetary gear
72 second drive gear
73 output part/hollow shaft
A axis
F direction of force
P shaft position
R direction of rotation
S switching position

The invention claimed is:

1. An actuator assembly for actuating two switching units in the driveline of a motor vehicle, comprising:
a housing,
an actuator drive,
a switching rod, which is arranged in the housing and is axially movable by the actuator drive in at least three positions,
a first switching element and a second switching element, which are axially movably arranged on the switching rod,
a spring element which biases the first switching element against a first shaft stop and the second switching element against a second shaft stop in opposite axial directions,
a first housing stop against which the first switching element is axially supported when the switching rod is moved in a direction of force acting from the spring element on the first switching element,
a second housing stop against which the second switching element is axially supported when the switching rod is moved in a direction of force acting from the spring element on the second switching element.

2. The actuator assembly according to claim 1,
wherein the actuator drive is configured in the form of a rotary drive, wherein the switching rod is rotatably drivable by the rotary drive, and wherein a spindle mechanism is provided which converts a rotary movement of the switching rod into an axial movement of the switching rod.

3. The actuator assembly according to claim 1,
wherein the switching rod, starting from a central position, is movable by the actuator drive into a first axial position, with the first switching element being supported against the first housing stop, and the second switching element being spaced from the second housing stop, and that the switching rod, starting from the central position, is movable by the actuator drive into an opposite second axial position, with the second switching element being supported against the second housing stop, and the first switching element being spaced from the first housing stop.

4. The actuator assembly according to claim 1,
wherein the spring element axially biases the first switching element and the second switching element away from each other, wherein the first housing stop and the second housing stop are facing axially towards each other.

5. The actuator assembly according to claim 1,
wherein the spring element is arranged on the switching rod between the first switching element and the second switching element, with the spring element being formed as a helical spring.

6. The actuator assembly according to claim 1,
wherein at least one of the first switching element and the second switching element is formed as a switching fork which is configured to axially move a switching sleeve.

7. The actuator assembly according to claim 1,
wherein the first switching element is for actuating a first switching unit, and the second switching element is for actuating a second switching unit.

8. The actuator assembly according to claim 7,
wherein at least one of the first switching unit and the second switching unit includes a form-locking clutch.

9. The actuator assembly according to claim 7,
wherein at least one of the first switching unit and the second switching unit is designed for drivingly connecting or disconnecting a differential gearing.

10. The actuator assembly according to claim 2,
wherein the switching rod is supported at one end by the spindle mechanism and at the other end by a plain bearing so as to be rotatable in the housing about an axis of rotation.

11. The actuator assembly according to claim 2,
wherein the spindle mechanism has a support part which is connected to the housing in a rotationally fixed and axially fixed manner, and a rotary part which is connected to the switching rod in a fixed manner and which is connected to the support part in a screwable manner, so that rotation of the switching rod and the rotary part connected thereto relative to the support part causes axial displacement of the switching rod.

12. The actuator assembly according to claim 2,
wherein a first drive element arranged in a power path between the rotary drive and the switching rod is axially displaceable relative to a second drive element in engagement therewith.

13. The actuator assembly according to claim 1,
wherein a transmission stage is provided between the actuator drive and the switching rod.

14. The actuator assembly according to claim 1, in a transmission assembly comprising:
- a differential gearing including a rotatably drivable differential cage, a first differential output part for driving a first side shaft and a second differential output part for driving a second side shaft;
- a first switching unit arranged between the differential cage and a drive member to selectively connect for torque transmission the differential cage to the drive member or disconnect the differential cage from the drive member, and
- a second switching unit by which one of the first and second differential output parts is connectable for torque transmission to the associated side shaft or disconnectable therefrom,
wherein the first switching unit is actuatable by the first switching element of the actuator assembly, and the second switching unit is actuatable by the second switching element.

15. The actuator assembly according to claim 1 in a transmission assembly for a hybrid drive with an internal combustion engine and an electric machine, the transmission assembly comprising:
- a multi-step gearing drivably connectable to an internal combustion engine and having a clutch to selectively connect a multi-step gearing input part and a multi-step gearing output part via a first shift stage or a second shift stage, or disconnect the multi-step gearing input part and the multi-step gearing output part from each other;
- a reduction gearing having a reduction gearing input part connectable to the electric machine and configured to slow down a rotary motion introduced into the reduction gearing input part to a reduction gearing output part;
- a superposition gearing having a first input part drivingly connected to the multi-step gearing output part, a second input part drivingly connected to the superposition gearing output part, and an output part, wherein the first input part, the second input part and the output part have a balancing effect on each other,
- a differential gearing with a differential cage drivingly connected to and arranged coaxially to the output part of the superposition gearing, and a first differential output part for driving a first side shaft and a second differential output part for driving a second side shaft;
- a controllable first switching unit operatively arranged between two of the first input part, the second input part and the output part of the superposition gearing; and
- a controllable second switching unit arranged in the power path between the output part of the superposition gearing and one of the first side shaft and the second side shaft.

* * * * *